United States Patent [19]

Wilson

[11] 4,149,210
[45] Apr. 10, 1979

[54] ELECTRICAL APPARATUS INCLUDING INTERLOCKING CIRCUIT FOR SHORT-TIME DELAY AND LONG-TIME DELAY TRIPPING

[75] Inventor: John T. Wilson, Brighton, Pa.

[73] Assignee: Westinghouse Electric Corp., Pittsburgh, Pa.

[21] Appl. No.: 831,711

[22] Filed: Sep. 9, 1977

[51] Int. Cl.[2] .............................................. H02H 7/26
[52] U.S. Cl. ...................................... 361/95; 361/68; 361/96
[58] Field of Search ........................ 361/95, 96, 97, 94, 361/68, 69, 67, 62, 64, 93, 196; 307/293, 294

[56] References Cited

U.S. PATENT DOCUMENTS

| 3,604,983 | 9/1971 | Levin et al. | 361/95 |
| 3,660,722 | 5/1972 | Wilson et al. | 361/96 |
| 3,697,810 | 10/1972 | Wilson et al. | 361/44 |
| 3,733,517 | 5/1973 | Wilson | 361/44 |
| 3,806,764 | 4/1974 | Hobson, Jr. et al. | 361/95 X |

*Primary Examiner*—Patrick R. Salce

*Attorney, Agent, or Firm*—M. J. Moran

[57] ABSTRACT

A circuit breaker of the type having short delay and long delay tripping modules. Separate signals are provided as external outputs from the latter modules. Furthermore, inputs are provided to the latter modules for disabling the normal operation thereof. The above-mentioned breaker also includes an instantaneous tripping circuit. If the amount of overload current is sufficiently high, an instantaneous tripping operation takes place. If the overload current is relatively lower than that which would necessitate instantaneous tripping, short delay or long delay tripping will take place. If the current then continues to increase to a sufficiently high value, the circuit breaker will operate through the instantaneous tripping circuit. One of the above-mentioned circuit breaker apparatus can be interconnected with others so that one circuit breaker in an electrical line to be protected will open and provide output signals which will prevent the short delay and long delay of other circuit breakers in the system from operating thus saving some of the protected system from shut-down.

14 Claims, 7 Drawing Figures

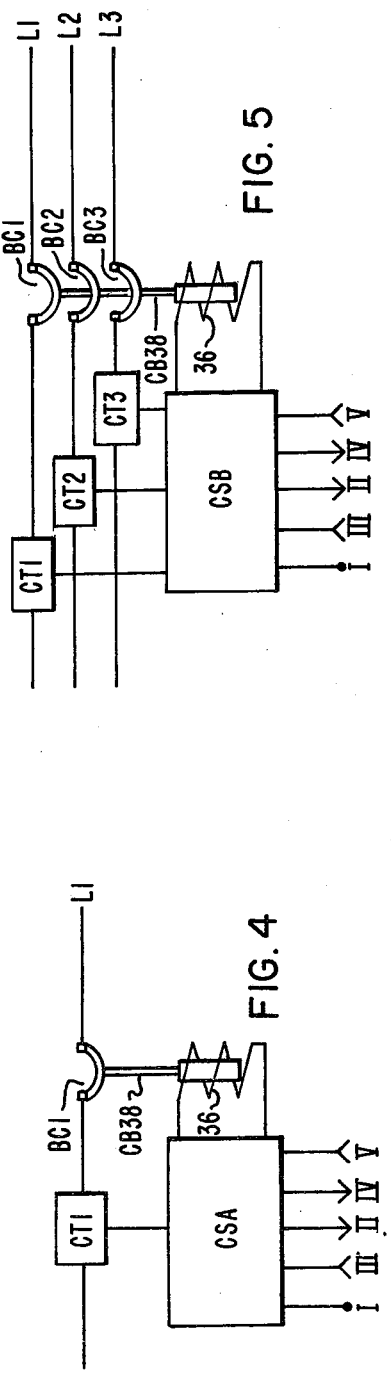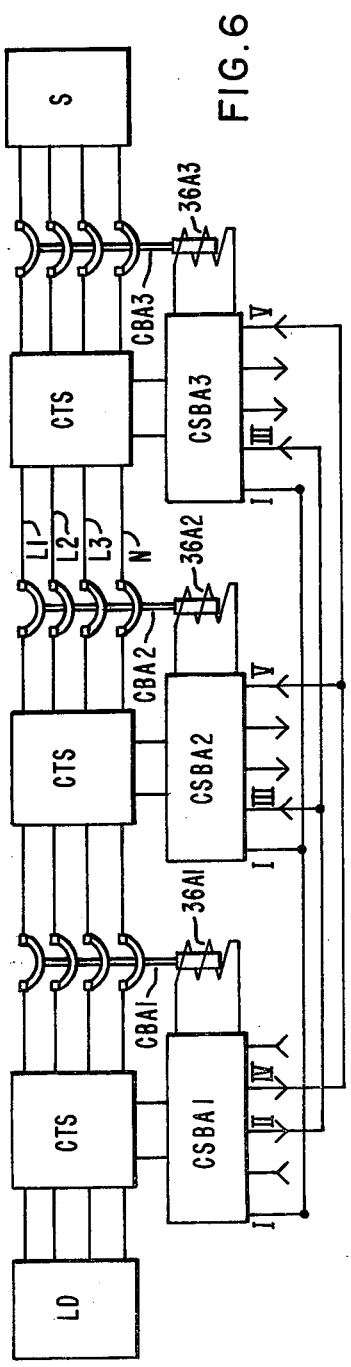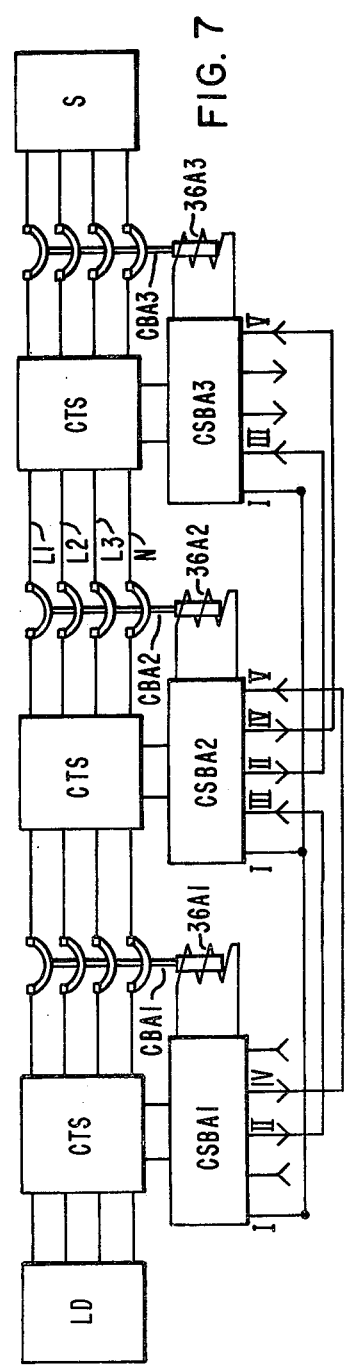

ELECTRICAL APPARATUS INCLUDING INTERLOCKING CIRCUIT FOR SHORT-TIME DELAY AND LONG-TIME DELAY TRIPPING

BACKGROUND OF THE INVENTION

The subject matter of this invention relates generally to circuit breakers and more specifically to electrically interconnected circuit breakers.

It is well known to provide electronic control systems for circuit breakers. An example of such a system is shown in U.S. Pat. No. 3,660,722 issued May 2, 1972 to J. T. Wilson et al. In the latter system, various control functions are provided. As an example, a short-time delay tripping circuit is provided, a long-time delay tripping function is provided, a ground fault current tripping function is provided and an instantaneous tripping function is provided. The long-time delay tripping circuit is utilized when the amount of overload current is only slightly larger than the rated current of the circuit breaker. In such a case, the tripping of the circuit breaker follows the wellknown $I^2t=K$ relationship. In the case where the amount of overload current is substantially higher than the rated current of the circuit breaker, but not of such a catastrophic nature as to require instantaneous tripping, a short time-fixed delay before tripping is provided. In this case, a fixed predetermined time for tripping is initiated once the current reaches a predetermined value. If the current does not drop below that predetermined value within the short delay time the circuit breaker will trip. Of course, if the circuit breaker current reaches substantially higher current values which may be of a catastrophic nature the circuit breaker is tripped instantaneously. Another function of the control system is to provide circuit breaker tripping for ground fault currents of a predetermined magnitude. Ground fault currents generally are of a relatively low magnitude but are relatively dangerous because of the presence of electrical arcs between the system being protected and ground. As a result, ground fault circuit tripping control systems have been recently developed. An example of a ground fault control system is shown in U.S. Pat. No. 3,733,517 issued May 15, 1973 to J. T. Wilson. In this case, ground fault current is sensed by an appropriate monitor and a control system connected thereto initiates actuation of the circuit breaker to remove the ground fault or to interrupt the line in which the ground fault is flowing. In conjunction with the latter system, apparatus was developed for electrically communicating between the ground fault tripping control system of a number of circuit breaker systems. In the latter case, output signals are provided from one circuit breaker to another to disable the ground fault tripping system of the latter circuit thus giving the former circuit breaker control system an opportunity to isolate the ground fault from the system or a portion thereof, without shutting down the entire system. The latter apparatus is explained in U.S. Pat. No. 3,697,810 issued Oct. 10, 1972 to J. T. Wilson et al. It is desirous in the art of circuit breaker control to actuate the opening of a circuit breaker only under the worst conditions. Electrical overloads, short circuits and faults are dangerous and undesirable, but on the other hand the closing down of an electrical system is also undesirable. It is desirous therefore to close down the electrical system as close to the fault as possible, as fast as possible without closing down the remaining sections of the system. For this reason the previously described short delay and long delay tripping functions have been implemented. The reasoning is that electrical apparatus or electrical conditions which may cause overloads to exist on systems to be protected may disappear or correct themselves after a period of time. Consequently, if the physical characteristics of the circuit breaker are such that the amount of overload current can be tolerated for that period of time, it is desirous to keep the circuit breaker on the line in hopes the condition which is causing the overload will be corrected. If the overload current is of a relatively low magnitude, the circuit breaker can stay on the line for a very long period of time. On the other hand, if the overload current is of a significantly higher value, the circuit breaker can stay on the line for only a shorter period of time. Of course a value of overload current may eventually be reached where the circuit breaker must open instantaneous to protect property and lives. As was described previously, each circuit breaker in a control system may have independent short delay and long delay sensing and control apparatus. Two, three, or even more circuit breakers may be connected in series in a line which is carrying overload or fault current. Because each of the control systems are independent, all of the control systems sense the overload or fault current and begin to react accordingly. It is known, that the fault or overload may be isolated in many cases merely by opening one of the circuit breakers. Consequently it is not necessary to open the other circuit breakers. The other circuit breakers may be controlling current which feeds lines which are not protected by the first circuit breaker and as a result, the opening of the latter circuit breakers will interfere with the operation of a normally operating portion of the electrical distribution system. Past designers of circuit breaker equipment have envisioned this and have thus provided long delay and short delay timing functions. These functions give a first circuit breaker an opportunity to clear the system of overload current. Naturally if the system is cleared, the long delay or short delay timing functions is aborted on an individual basis and the remainder of the distribution system continues to operate naturally. The same would be true if the fault were not cleared but the first circuit breaker remained opened. Of course, the above-mentioned cooperation is independent from circuit breaker to circuit breaker. It would be advantageous if backup control for the independent circuit breaker systems could be provided by electrically interconnecting them. In this way one circuit breaker system can be keyed to react in response to what is happening in another circuit breaker system. It would also be advantageous if the short delay tripping circuit and the long delay tripping circuit for subsequent circuit breakers could be disabled while a first circuit breaker tested the distribution system to see if its reaction to the flow of overload current cleared the entire system of fault current.

SUMMARY OF THE INVENTION

In accordance with the invention, apparatus is taught for protecting an electrical system with a plurality of circuit breakers. A first circuit breaker immediately opens upon the occurrence of a relatively low value of fault current to attempt to isolate the source of fault current from the remaining portions of the system being protected. The latter opening operation does not require the substantial amount of overload current for initiation as a normal instantaneous opening operation would require. An amount of current which would be sufficient merely to actuate a short delay or long delay tripping operation will instead cause an instantaneous tripping of the first circuit breaker. This is a significantly different concept than was taught in the prior art. In essence, the well-known short delay and long delay tripping functions are overridden. This is accomplished by providing an overriding circuit for both the long delay and the short delay circuits of the circuit breaker. Each circuit breaker in the system has the same capability and will cause an instantaneous tripping in the presence of a relatively low overload current. This is undesirable. Consequently a signal is provided from the first circuit breaker to the latter circuit breaker or circuit breakers to prevent the instantaneous tripping circuit from operating. Thus, the normal short delay and long delay timing functions continue in the other circuit breakers in the system. Eventually, if the opening of the first circuit breaker does not clear the fault, the normal short delay, long delay or instantaneous tripping circuits will clear the fault in subsequent circuit breakers. The system described therefore, provides a way for determining the location of a fault and for reacting to isolate the fault without unduly jeopardizing the integrity or the operation of the remaining portions of the electrical system.

BRIEF DESCRIPTION OF THE DRAWINGS

For a better understanding of the invention, reference may be had to the preferred embodiments thereof, shown in the accompanying drawings, in which:

FIG. 4 shows a simplified block diagram of the apparatus of FIG. 1 for a single phase circuit;

FIG. 5 shows a simplified block diagram of the apparatus of FIG. 1 for a three phase circuit;

FIG. 6 shows a three control station, three phase electrical system with a first interconnection scheme; and, FIG. 7 shows a three control station, three phase electrical system with a second interconnection scheme.

DESCRIPTION OF THE PREFERRED EMBODIMENTS

Figure 1:
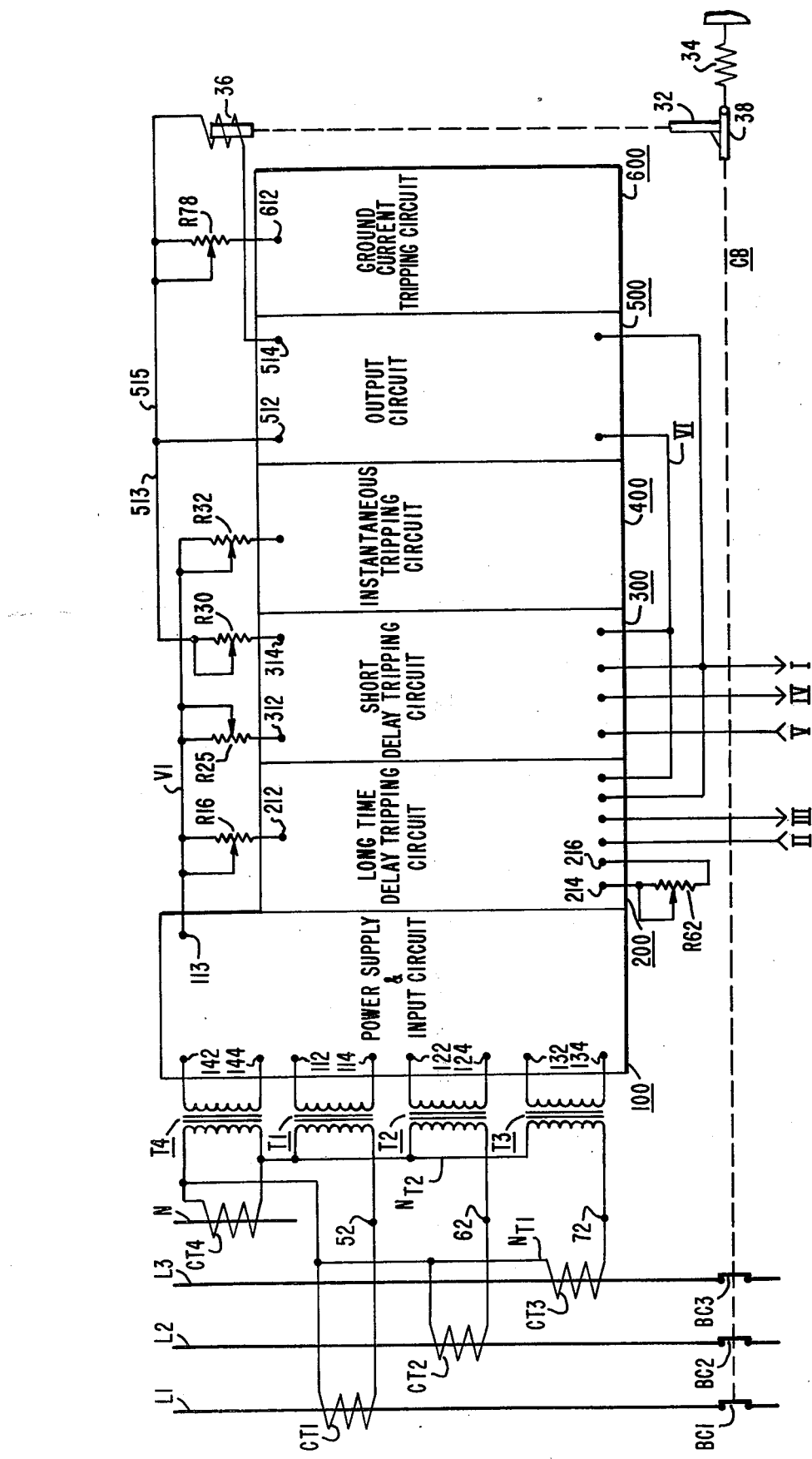
FIG. 1 shows a circuit breaker partially in schematic form and partially in block diagram form with circuit connections.

Referring now to the drawings and FIG. 1 in particular, there is illustrated a circuit breaker CB including a protective relay device associated with the line conductors L1, L2 and L3 and the neutral conductor N of an electrical power system or circuit to be protected. It will be assumed for purposes of the present description that the electrical system is a three phase, four wire alternating current system represented by the line conductors L1, L2, and L3 and the neutral conductor N and designed for operation at a frequency of 60 hertz or cycles per second.

The circuit breaker CB is provided for segregating or isolating portions of the electrical system under certain abnormal or fault conditions such as an overcurrent condition or a ground fault condition. The circuit breaker CB includes a plurality of separable or movable line contacts BC1, BC2 and BC3 which are closed when the circuit breaker is closed and which are opened when the circuit breaker is open. The circuit breaker CB also includes a trip coil 6 which, when energized, while the circuit breaker CB is closed results in a tripping or opening operation of the circuit breaker CB. As illustrated diagrammatically in FIG. 1, energization of the trip coil 36 may actuate an operating member 32 to release a latch member 38 to thereby actuate an opening operation of the line contacts BC1, BC2 and BC3 under the influence of a suitable operating means such as the opening spring 34, which may be operatively connected to said line contacts.

In general, the protective device shown in FIG. 1 is arranged to respond to only the highest of the line currents which flow in the conductors L1, L2 and L3 to energize the trip coil 36 and to actuate the tripping of the circuit breaker CB after a time delay which is initiated when the highest of the line currents in the conductors L1, L2 and L3 exceeds a predetermined value and which varies inversely with substantially the square of the highest of the line currents in said conductors for a predetermined range of overcurrents in said conductors. Where desired, the protective device shown in FIG. 1 may also respond to the highest of the line currents in the conductors L1, L2 and L3 to energize the trip coil 36 and to actuate the tripping of the circuit breaker CB in a substantially instantaneously manner without any intentional time delay when the highest of the line currents in said conductors exceeds a predetermined value or to independently energize the trip coil 36 and to actuate the tripping of the circuit breaker CB after a substantially fixed or predetermined time delay when the highest of the line currents in said conductors exceeds a predetermined value. In addition, in accordance with the invention, the protective device shown in FIG. 1 may respond to ground current in the electrical system which includes the line conductors L1, L2 and L3 and the neutral conductor N to energize the trip coil 36 and to actuate the tripping of the circuit breaker CB after a substantially fixed or predetermined time delay when the ground current exceeds substantially a predetermined value which initiates the start of the predetermined time delay as long as the highest line current in the conductor L1, L2 and L3 remains below substantially a predetermined conductors or when the ground current exceeds a value which varies with the highest line current in the conductors L1, L2 and L3 after the highest line current in said conductors exceeds the last-mentioned predetermined value.

In order to obtain a plurality of output currents which are directly proportional to the line currents in the conductors L1, L2 and L3, a plurality of current transformers or sensors CT1, CT2 and CT3 are provided, as shown in FIG. 1, with the windings of said current transformers being energized in accordance with the line currents in the conductors L1, L2 and L3 respectively. In addition, in order to obtain an output current which is directly proportional to the current in the neutral conductor N, a current transformer CT4 is provided as shown in FIG. 1, with the winding of the current transformer CT4 being energized in accordance with the current in the neutral conductor N. The output windings of the current transformers CT1, CT2 and CT3 may be wye connected between the neutral terminal or conductor NT1 and the respective output terminals 52, 62 and 72, respectively to provide an output current to the ground current transformer T4 which varies with the degree of unbalance of the currents in the line conductors L1, L2 and L3 where ground fault protection is desired. It is to be noted that in a four wire alternating current system, as illustrated in FIG. 1, current flows in the neutral conductor N even with no ground fault present whenever an unbalanced load causes the three phase or line currents to be unequal. During such an operating condition, the current in the neutral conductor N would not be sensed or detected by the current transformers CT1, CT2 and CT3 and a net current would flow from the conductor NT1 to the primary winding of the ground current transformer T4 which would then improperly indicate a ground fault current. The output winding of the additional current transformer CT4 is therefore connected to the primary winding of the ground current transformer T4 as shown in FIG. 1 to compensate the input current of the transformer T4 for the current flowing in the neutral conductor N. The current transformer CT4 reflects any current in the neutral conductor N to the primary winding of the transformer T4 so that all current components applied to the ground current transformer T4 from the current transformers CT1, CT2, CT3 and CT4 cancel during the operating condition when the loads connected to the line conductors L1, L2 and L3 are unbalanced, but when there is no actual ground fault. When an actual ground fault does occur in the alternating current system shown in FIG. 1, the fault current in the neutral conductor N appears only in the primary winding of the ground current transformer T4 and the alternating output current in the secondary winding of the transformer T4 is substantially proportional to only the ground fault current in the alternating current system shown in FIG. 1.

In order to further step-down the output currents of the current transformers CT1, CT2 and CT3, the intermediate transformers T1, T2 and T3 which may be of the saturating type are connected between the secondary windings of said current transformers and the input terminals of the power supply input circuit 100 of the protective device shown in FIG. 1. More specifically, the primary windings of the transformers T1, T2 and T3 are wye connected between the output terminals 52, 62 and 72, respectively of the current transformers CT1, CT2 and CT3, respectively and the neutral conductor NT2, with the neutral terminal NT2 being connected to the neutral terminal NT1 of said current transformers through the primary winding of the ground current transformer T4 in accordance with the invention. The secondary windings of the intermediate transformers T1, T2 and T3 are connected to the input terminals 112 and 114, 122 and 124, and 132 and 134, respectively of the power supply input circuit 100 of the protective device shown in FIG. 1 to provide three alternating output currents which, in turn, are directly proportional to the line currents in the conductors L1, L2 and L3 of the electrical system, as illustrated. The secondary winding of the ground current transformer T4 is connected to the input terminals 142 and 144 of the power supply input circuit 100 to provide an alternating output current which is directly proportional to the ground fault current in the alternating current system which includes the conductors L1, L2 and L3 and the neutral conductor N.

The operation of circuit modules 100, 400 and 600 are not of central importance in describing the concepts of the present invention. Consequently, a description of the construction and operation thereof may be found in previously referred to U.S. Pat. No. 3,660,722. On the other hand, circuit modules 200, 300 and 500 may operate differently from their counterparts as disclosed in the previously mentioned U.S. Pat. No. 3,660,722. As can be seen in FIG. 1, six lines identified by the Roman numerals I through VI are associated with the circuit modules 200, 300 and 500. As an example, line I interconnects portions of the long-time delay tripping circuit 200, the short delay tripping circuit 300, and the output circuit 500. Also, line II is a long delay input line for the long-time delay tripping circuit 200. Furthermore, output III is a long delay output circuit for long-time delay tripping circuit 200. In addition, line IV is a short delay output line for short delay tripping circuit 300. Also, line V is a short delay input line for short delay tripping circuit 300. Finally, line VI interconnects the long-time delay tripping circuit 200, the short delay tripping circuit 300, and the output circuit 500. The interconnection and operation of the lines I through VI will be described in more detail hereinafter with respect to other Figures.

Figure 2:
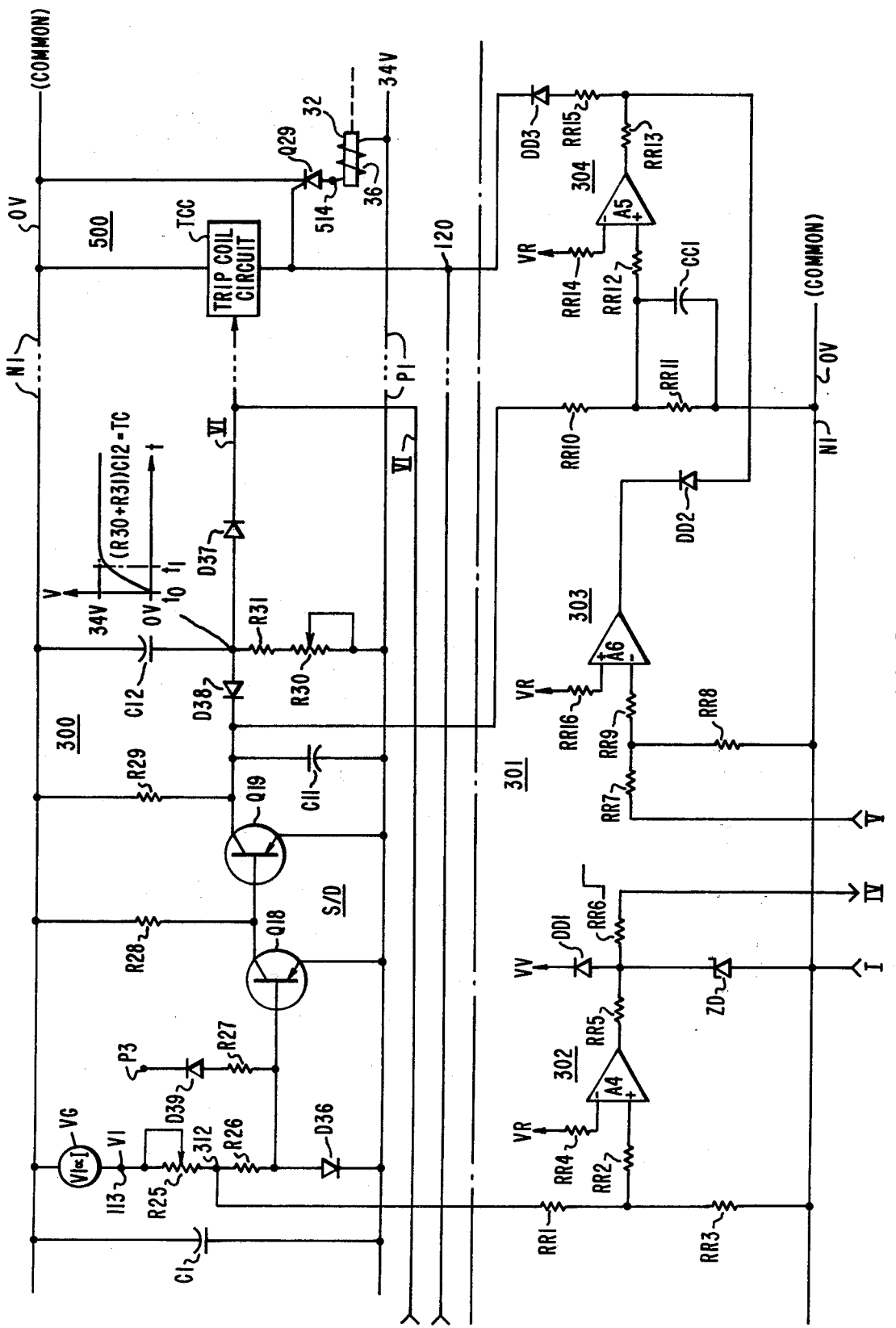
FIG. 2 shows the short delay tripping circuit of FIG. 1 in circuit diagram form.

Referring now to FIG. 2, an electronic circuit 300 or S/D suitable for implementing the functions of the short delay tripping circuit 300 of FIG. 1 is shown. There are provided two conductors P1 and N1. Conductor P1 may be energized at 34 volts positive relative to common or neutral conductor N1 which may be energized at 0 volts. A capacitive element C1 is connected between the conductors N1 and P1. Likewise, a voltage source VG of any suitable type is interconnected between the neutral conductor N1 and a point 113. The voltage source VG produces a voltage V1 which is proportional to current. Voltage source VG is connected on one side thereof to line N1. Voltage VI which is present at point 113 may be proportional to the highest value of current flowing in any of the lines L1, L2 or L3 of FIG. 1 as was described previously. Connected to point 113 is one terminal of a potentiometer element R25, the other terminal of which is connected to a fixed resistive element R26 at terminal 312. The remaining side of the fixed resistive element R26 is connected to one side of a resistive element R27, to the base of a transistor Q18 and to the anode of a diode D36. The other side of the resistive element R27 is connected to the anode of a diode D39, the cathode of which is connected to a source of voltage potential P3. The collector of the transistor Q18 is connected to the base of another transistor Q19 and to one side of a resistive element R28. The collector of the transistor Q19 is connected to one side of a resistive element R29, to one side of a capacitive element C11 and to the cathode of a diode D38. The anode of the diode D38 is connected to one side of a capacitive element C12, to one side of a resistive element R31 and to the anode of a diode D37. The other side of the resistive element R31 is connected to one side of a potentiometer resistor R30. The other side of the potentiometer resistor R30 and the wiper thereof as well as the other side of the capacitive element C11, the emitters of both transistors Q18 and Q19 and the cathode of the diode D36 are connected to the previously mentioned conductor P1. The other side of the resistive element R28 as well as the other side of the resistive element R29 and the other side of the capacitive element C12 are connected to the conductor N1. The cathode of the diode D37 is connected to the line VI shown in FIG. 1 and is connected to the input of a trip coil circuit TCC of output circuit 500. One side of the trip coil circuit TCC is connected to the line N1 and the other side thereof is connected to the gate of a silicon controlled rectifier or similar gated means Q29. The anode of the SCR Q29 is connected to one side of a coil 36, the other side of which is connected to the conductor P1. Coil 36 is also shown in FIG. 1 as is the plunger or core means 32 which is utilized to actuate the circuit breaker mechanism CB38. Electrical point 514, also shown in FIG. 1, is interposed between the anode of the gated element Q29 and the coil 36.

Connected to a point 312 between the resistive element R25 and the resistive R36 is a line which leads to a voltage divider which comprises resistive elements RR1 and RR3 in circuit 302. The other side of the resistive element RR3 is connected to the neutral line or conductor N1. Connected to the interconnection point between the resistive elements RR1 and RR3 is one side of a resistive element RR2, the other side of which is connected to the positive input terminal of a differential amplifier A4. A resistive element RR4 is connected to the negative terminal of the differential amplifier A4 and to a positive reference voltage VR. The output of the differential amplifier A4 is connected to one side of a resistive element RR5, the other side of which is connected to the anode of a diode DD1, one side of a resistive element RR6, and the regulating terminal of Zener diode ZD. The anode of the Zener diode ZD is connected to the conductor N1 and the cathode of the diode DD1 is connected to another voltage source VV. The other side of the resistive element RR6 is connected to the short delay output line IV which is also shown in FIG. 1.

The short delay input line V, also shown in FIG. 1, is shown in FIG. 2 connected to one side of a resistor RR7 of circuit 303. The other side of the resistor RR7 is connected to one side of a resistive element RR8 and one side of a resistive element RR9. The other side of the resistive element RR9 is connected to the negative input terminal of the differential amplifier A6, the positive terminal of which is connected to one side of a resistive element RR16. The other side of the resistive element RR16 is connected to the previously described reference voltage VR. The output terminal of the differential amplifier A6 is connected to the cathode of an anode DD2, the anode of which is connected to one side of a resistive element RR13 and one side of a resistive element RR15. The other side of the resistive element RR15 is connected to the anode of the diode DD3, the cathode of which is connected to the output of the trip coil circuit TCC described previously with respect to the output circuit 500. As can be seen, this also represents the gate terminal of the silicon controlled rectifier or similar thyristor gated means Q29. The other side of the resistive element RR8 is connected to the neutral terminal N1.

The collector of the transistor Q19 is connected to one side of a resistive element RR10, the other side of which is connected to one side of a resistive element RR11, one side of a resistive element RR12, and one side of a capacitive element CC1 of circuit 304. The other side of the resistive element RR11 and the other side of the capacitive element CC1 are connected to the common terminal N1. The other side of the resistive element RR12 is connected to the positive input terminal of a differential amplifier A5, the negative terminal of which is connected to a resistive element RR14. The other terminal of the resistive element RR14 is connected to the previously described reference voltage source VR. The output of the differential amplifier A5 is connected to the other side of the previously described resistive element RR13. The common conductor N1 represents the line I shown in FIG. 1.

Figure 3:
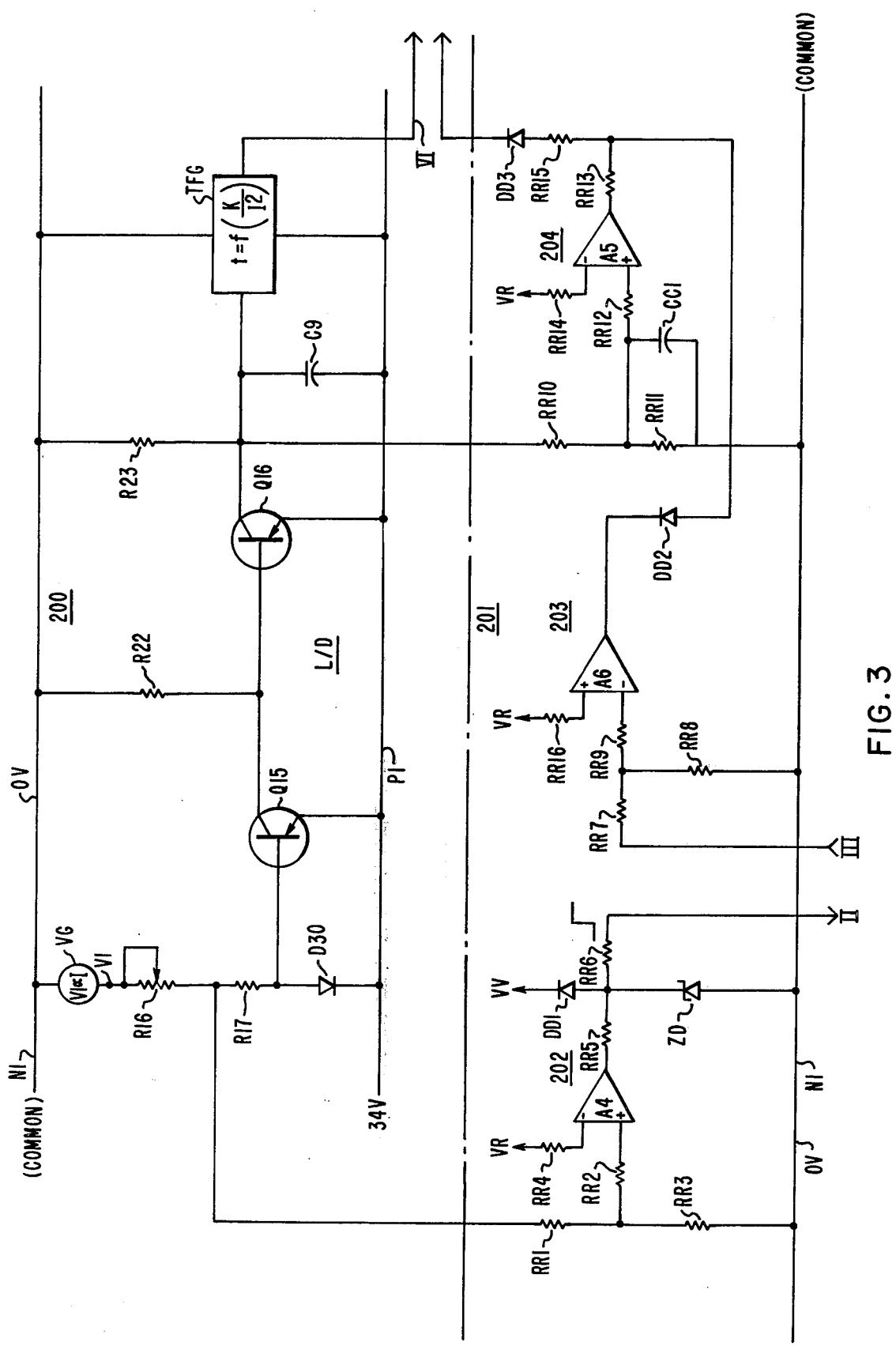
FIG. 3 shows the long delay tripping circuit of FIG. 1 in circuit diagram form.

Referring now to FIG. 3, an electronic circuit 200 L/D for implementing the function of the long-time delay tripping circuit 200 of FIG. 1 is shown. As was the case with respect to the circuit of FIG. 2, lines N1 and P1 are provided. The voltage source VG previously described with respect to the embodiment of FIG. 2, is present and provides a voltage V1 which is proportional to current in the lines to be protected as was described previously. Connected to one side of the voltage generator VG is the negative terminal or conductor N1. Connected to the other side is one terminal of a potentiometer resistive element R16. The other terminal and the wiper of potentiometer R16 is connected to a resistive element R17. The other side of the resistive element R17 is connected to the anode of the diode D30 and to the base of a transistor Q15. The collector of the transistor Q15 is connected to one side of the resistive element R22 and to the base of a transistor Q16. The collector of the transistor Q16 is connected to one side of the resistive element R23, to one side of a capacitive element C9 and to the input to a timing function generator TFG which provides a timing function. To be more specific, the timing function is such that time is inversely proportional to the square of the current in the lines to be protected. As is shown in the function block t is equal to f $(K/I^2)$. The power for the timing function generator TFG is supplied from the lines N1 and P1. The output of the timing function generator TFG is connected to the line VI described and shown with respect to FIG. 1. The timing generator may be of the type shown in the previously described U.S. Pat. No. 3,660,722. Specifically, it may include portions of the long-time delay tripping circuit 200 shown therein and described with respect thereto. The cathode of the diode D30, the emitters of the transistors Q15 and Q16 and other side of the capacitor C9 are all connected to the positive conductor P1. The other side of the resistive elements R22 and R23 are connected to the neutral conductor N1.

Connected to the junction between the resistive element or potentiometer R16 and the resistive element R17 is a lead which is connected to one side of the resistive element RR1 of circuit 202. Connected to the collector of the transistor Q16 is a lead which is connected to one side of the resistive element R10 of circuit 204. The circuits 202, 204 and 203 to which these two leads are connected are essentially the same as circuits 302, 304 and 303 respectively shown and described with respect to FIG. 2, the difference being that a long delay output II and long delay input III are substituted for the short delay output IV and short delay input V, respectively. The cathodes of the diode DD3 shown in FIGS. 2 and 3 are connected to the same point, namely the gate of the silicon controlled rectifier or similar thyristor gated means Q29.

Operation of the Short Delay Circuit 300

It will be noted with respect to the embodiment of FIG. 2 that two potentiometers, namely R25 and R30 are provided for setting parameters of the circuit. As an example, potentiometer R25 is provided for setting the percentage of overload current at which the circuit 300 will pick up or become actuated, that is, the percentage of overload current at which a short-time delay function is initiated. On the other hand, potentiometer R30 is utilized to set the increment of the short-time delay. Circuit 301 with its component parts 302, 303 and 304 provides additional functions from the functions described with respect to the resistive elements R25 and R30. In addition, the particular functions of circuit 301 are not necessarily initiated within the unit but may be initiated in other units. Typically, the current values at which short-time delay signals are initiated for the trip circuit 500 vary between 100% and 700% of full load current. If the line current is in this range, the voltage V1 at point 113 will be of sufficient magnitude to change the status of the transistor Q18. As an illustrative example, a 34 volt signal at the voltage generator VG is chosen to be the crossover voltage. If the current which generates the voltage V1 is less than a predetermined value, the voltage V1 will be less than 34 volts. Conversely, if the current is above a certain value, the voltage V1 will be above 34 volts. By adjusting the resistive element R25 any convenient current value between 100% and 700% of full rated current may be utilized to cause a change in state of the transistor Q18. Normally, when the voltage V1 is less than 34 volts, the diode D36 is reverse biased and the transistor Q18 is forward biased, thus putting it in the on state. This reverse biases the transistor Q19 putting it in the off state, thus maintaining the voltage at the cathode of the diode D38 at 0 volts. The voltage at the anode of the diode D38 is at 34 volts. Consequently, the diode D38 is forward biased thus essentially shorting out the capacitive element C12 through resistor R29 and maintaining the voltage at the common junction between the anodes of the diodes D38 and D37 at approximately 34 volts. On the other hand, when the current of the voltage generator VG exceeds the predetermined value, the voltage V1 becomes larger than 34 volts thus reverse biasing the transistor Q18 which turns that transistor off. This forward biases the transistor Q19 turning it on and changing the voltage at the anode of the diode D38 from 0 to approximately 34 volts. This reverse biases the diode D38 allowing the capacitive element C12 to charge through the series combination of the resistive element R31 and the potentiometer R30. The charging time constant TC of the capacitor C12 is variable as a function of the setting of the potentiometer R30. At time t1 (as shown in the graph), the voltage at the junction between the diodes D38 and D37 reaches a value which causes the trip coil circuit TCC of unit 500 to provide a signal sufficiently large in magnitude to actuate the thyristor Q29 to thus energize the coil 36 to thus actuate the plunger 32 to open the circuit breaker 38 shown in FIG. 1. With regard to element 500 shown in FIG. 2, the trip coil circuit TCC may be of any convenient kind sufficient to actuate or energize the thyristor device Q29.

Also shown in FIG. 2 is circuit 301 which contains auxiliary circuits 302, 303 and 304. The input line for circuit 302 is connected to the junction 312 between the resistive element R25 and the resistive element R26. As the voltage V1 rises, the voltage drop across the voltage divider which includes resistive elements RR1 and RR3, increases to the point where the voltage at the positive terminal of the differential amplifier A4 exceeds the reference voltage VR, at which point the status of the output of the differential amplifier A4 changes from a binary zero to a binary one thus providing an output signal on the short delay output line IV. This signal may be interconnected with appropriate portions of other circuits for providing a means of communication between the local circuit shown in FIG. 2 and the other circuits. Circuit unit 304 is connected so that when transistor Q19 turns from an off state to an on state, a voltage is impressed across the voltage divider R10, R11 such that the voltage at the positive terminal of the differential amplifier A5 exceeds the reference voltage VR. This provides a positive output signal which immediately energizes the thyristor Q29 through diode DD3 thus bypassing the time delay circuit which includes the capacitive element C12, the diodes D37 and D38, the resistive elements R30 and R31, and the trip coil circuit TCC. Furthermore, an override circuit 303 is provided which controls the override circuit 304. As long as the diode DD2 is reverse biased, the output of the amplifier A5 will be allowed to seek whichever level is triggered by the conditions on the inputs thereof. Consequently an appropriate signal level may exist on the output of amplifier A5 which can cause an appropriate action to take place in thyristor Q29. On the other hand, if the diode DD2 becomes forward biased, the output of the differential amplifier or comparator A5 will remain at or near zero regardless of the condition of its inputs. As long as the reference voltage VR is larger than the voltage on the negative terminal of the comparator A6, the diode DD2 will be reverse biased. However, if the voltage on the negative terminal of the comparator A6 becomes larger than the reference voltage, the diode will become forward biased thus overriding the output of the comparator amplifier A5. The latter condition will exist when a voltage is impressed across the voltage divider RR7, RR8 which is of sufficient magnitude as to make the voltage on the negative terminal of the differential amplifier A6 larger than the reference voltage VR. The voltage across the latter-mentioned voltage divider is controlled by the input line V. Consequently, a signal which may come from a remote station by way of line V can control the action of the electrical apparatus shown in FIG. 2.

To summarize the action of the circuits 300, 500, 301, 302, 303, and 304, the following can be said: the presence of a predetermined value of overload line current can cause the timing operation for a short delay trip to begin. This pick-up value of current can be set with the potentiometer resistor R25. The increment of the short delay can be set with the potentiometer resistor R30. When the predetermined pick-up current is achieved, a signal is provided for other locations by way of line IV. The short delay timing function will occur only if the override circuit 304 is overridden by the override circuit 303. This will occur only if there is an appropriate signal on the short delay input line V. Otherwise the overriding circuit 304 will bypass the short delay portion of circuit 300 causing a trip of the circuit breaker almost instantaneously.

Operation of the Long-Time Delay Tripping Circuit

Referring once again to FIG. 3, the operation of long-time delay tripping circuit 200 or L/D is described. In this case, it is desirous to initiate a tripping of the circuit breaker at a time which is an inverse function of the square of the current of the line to be protected. Typically, it is desirous to utilize this function when the value of current is in the range of 50% to 120% of the circuit breaker current rating. As was the case with respect to embodiment 300 shown in FIG. 2, the voltage generator VG provides a voltage V1 which is proportional to the amount of current flowing in the line to be protected. The potentiometer R16 may be adjusted to vary the percentage of current at which pick-up will occur, pick-up being defined as the initiation of the timing out operation of the timing circuit. For an illustrative example, the 34 volt crossover value utilized with regard to embodiment 300 of FIG. 2 will be also utilized in this case for consistency. As long as the voltage V1 is less than 34 volts, transistor Q15 will be forward biased and consequently will be on. Diode D30 will be reverse biased. Of course, the resistance value of the potentiometer R16 can be so adjusted that the 34 volt breakover point may correspond to any value of current in the range of 50% to 120% of breaker current rating. When the transistor Q15 is on, transistor Q16 is reverse biased and thus is off, because the base to emitter junction thereof is essentially short circuited by the conducting transistor Q15. When transistor Q16 is off, approximately 0 volts appears on the collector thereof. The collector represents an input to a timing function generator TFG which provides the well-known timing function $t = f(K/I^2)$. This is the well-known square of the inverse current versus time relationship. Any acceptable function generator which provides this function may be utilized. A typical example is shown in U.S. Pat. No. 3,660,722 and that part thereof which describes element 200. The timing function generator TFG is shown in block diagram form in this case for purposes of simplicity. The timing function generator TFG is shown interconnected with the power lines P1 and N1 for energization. The output of the timing function generator TFG is the line VI. Essentially line VI is the output line of the circuit 200, and by reference to FIG. 2 it can be seen that it is interconnected with the output line VI of circuit 300 both of which act as input lines for the trip coil circuit TCC of element 500 which is also shown in FIG. 2. The operation of the latter circuit has been described previously.

Associated with the circuit of embodiment 200 is the control module 201 which contains component parts 202, 203, 204. As was described previously, the elements of circuit 201 are essentially the same as the elements of circuit 301 described with respect to the embodiment of FIG. 2. In a like manner, the elements of circuit 202 are essentially the same as the elements of circuit 302 shown in FIG. 2. Furthermore, the elements of circuit 203 are essentially the same as the elements of circuit 303 shown in FIG. 2 and finally the elements of circuit 204 are essentially the same as the elements of circuit 304 shown in FIG. 2. Circuits 201 and 301 may be, but are not limited to being exactly the same. The operation of the various elements 202, 203, 204 is the same as the operation of elements 302, 303, 304, respectively. Essentially the top of resistor RR1 is interconnected between the junction of the resistive element R16 and R17 so that as the voltage V1 rises towards 34 volts in response to increasing line current, the voltage at the positive terminal of the operational amplifier A4 will eventually reach a point at which it exceeds the reference voltage VR. At this point, the status of the output of the comparator A4 will change from a zero value to some positive value which will exist on output line II which in this case is known as the long delay output line. Circuit 204 is interconnected at its input to the collector of the transistor Q16 so that its status will change from a digital zero to a digital one as the voltage on the collector of transistor 216 goes positive or becomes larger than the reference voltage VR. This will have the effect, described previously with respect to the embodiment of FIG. 2, of triggering or firing the thyristor Q29 at the gate thereof. The interconnection between the output at the cathode of the diode DD3 with the output at the cathode DD3 of element 304 is shown in FIG. 2 at point 120. Consequently, an appropriate output signal from either of the circuits 204 or 304 will cause energization of the thyristor Q29 and consequent tripping of the circuit breaker CB. It will be noted that the actuation of the element 204 will override the timing function generator TFG shown in element 200 and cause a nearly instantaneous trip of the circuit breaker regardless of the status of the timing function generator TFG. Consequently, the circuit 204 may be known as an override circuit for the timing function generator TFG. However, an additional overriding circuit 203 is provided for overriding the overriding circuit 204. If an appropriate signal is provided at the long delay input line III of sufficient magnitude to cause the voltage at the negative terminal of the comparator A6 to be larger than the reference voltage VR the diode DD2 will become reverse biased thus essentially shorting out the output of the comparator A5. This means that the instantaneous overriding signal which may have been provided at the output of the comparator A5 will be defeated or overridden and the normal timing function generator TFG output signal at line VI will control the operation of the control thyristor Q29.

It is to be understood with respect to the embodiments of both FIGS. 2 and 3 that the common line is identified by the Roman numeral I to be consistent with the nomenclature of FIG. 1. In summary, the operation of the element 200 is very similar to the operation of the element 300. In this respect, the attainment of a predetermined voltage V1 will cause an output signal to be provided at the long delay output line II. At the same time, an instantaneous tripping of the circuit breaker will be initiated by the element 204, the latter initiation overriding the tripping function generator TFG. This will occur unless an appropriate signal is present on the long delay input line III in which case the overriding element will in itself be overridden by circuit 203 thus allowing the timing function generator TFG to perform its normal timing operation at the line VI.

Referring now to FIG. 4 a functional block diagram of a circuit breaker control station for a single phase line L1 is shown. A current transformer CT1 is utilized to monitor the single phase line L1. The current transformer CT1 is shown interconnected schematically with a control system CSA which in turn provides energizing power to a circuit breaker trip coil 36. Circuit breaker trip coil 36 controls a circuit breaker operating mechanism CB38 which in turn controls separable contacts BC1 in the line L1. The control system CSA may contain any or all of the elements 200 through 600 shown in FIG. 1. The various input and output lines I through VI are also shown with appropriate arrows indicating whether the lines are for input or output purposes. The current transformer CT1 is utilized to sense the value of current flowing in the line L1. This information is supplied to the control system CSA which in turn energizes the coil 36 and actuates the mechanism CB38 to open or close the contact BC1 under appropriate conditions.

Referring now to FIG. 5 a circuit breaker control station for a three phase electrical system including lines L1, L2 and L3 is shown. In this case, each of the line L1, L2, and L3 have connected thereto current transformers or similar sensing means CT1, CT2 and CT3 respectively. These current transformers monitor the line currents, and supply information concerning the value of any or all of the line currents to a three phase control system CSB. The control system is interconnected with a circuit breaker energizing coil 36 which controls mechanism CB38 which in turn opens circuit breaker contacts BC1, BC2 and BC3 under appropriate conditions. It should be noted that the circuit breaker station will operate if any or all of the line currents exceed a predetermined value. This is not a necessary limitation, however, as appropriate adjustments may be made to the circuit breaker contacts and operating mechanism in some embodiments to open only one or two contacts if that is desired. It will be noted that the various interstation control lines I through V are shown for the control system CSB. These lines essentially are the same as the ones shown in FIGS. 1, 2, 3 and 4. The functions of these lines and the signals which are provided on them or utilized by them have been described with respect to the latter mentioned figures.

Referring now to FIG. 6, a three phase, four line electrical system including a source of electrical power S and a load LD is shown with three interconnected circuit breaker stations. Each of the circuit breaker stations has a set of current monitors identified as CTS for purposes of clarity of illustration. The currents which flow in the lines L1, L2, L3 and N are monitored by the current monitors CTS. There is provided in each case a set of circuit breaker contacts CBA1, CBA2 and CBA3 controlled by solenoids 36A1, 36A2 and 36A3 respectively. Each of the control coils 36A1, 36A2 and 36A3 is in turn energized by a station control system CSBA1, CSBA2 and CSBA3 respectively. Each of the latter-mentioned station control systems and interconnected in one possible interconnection mode which for purposes of simplicity of illustration shall be called the parallel mode of interconnection. In each case, the common or neutral line I for each station is connected to the other two terminals I. The long-time delay output terminal III of control station CSBA1 is connected to the inputs II of both the control systems CSBA2 and CSBA3. Likewise, the short delay output terminal IV of control station CSBA1 is connected to the input terminals V of the control stations CSBA2 and CSBA3. Branch circuits for the lines L1, L2, L3 and N between the stations are not shown, although it is to be presumed that such branch circuits may exist. Consequently, if a fault exists in any or all of the lines L1, L2, L3 or N downstream of the first control station CSBA1 of a magnitude which would normally actuate the short-time delay or long-time delay functions of that control station. Those functions will be overridden and the circuit breaker contacts CBA1 opened immediately. Meanwhile, appropriate overriding signals will be sent by way of lines III and IV to station control systems CSBA2 and CSBA3 to override the short delay and long delay functions of those stations. This is done with the idea that the immediate opening of the circuit breaker contact CBA1 may clear the fault immediately. The signals which are transmitted to the station control systems CSBA2 and CSBA3 prevent the instantaneous opening thereof, it being remembered that they are internally wired in each case to override their own short delay and long delay opening operations unless the secondary override is also actuated. The latter case, of course, is what happens when the aforementioned signals are provided on the lines III and IV by the circuit breaker control system CSBA1. The net effect of this is to immediately attempt to remove the fault by the opening of the contacts CBA1 while allowing the normal short delay and long delay timing functions to continue in the control systems CSBA2 and CSBA3. If the opening of the contacts CBA1 do no correct the problem and the current remains within acceptable limits in each case, the circuit breakers CBA2 and/or CBA3 will eventually open to clear the fault. If the opening of the circuit breaker contacts CBA1 clears the fault, the control systems CSBA2 and CSBA3 will return to normal operation and the need for the overriding signals on input terminals II and V in each case will be unnecessary. If the current increases to a catastrophic magnitude, each of the circuit breaker control systems CSBA1, CSBA2 and CSBA3 has independent instantaneous control functions contained therein which will open the various circuit breakers to protect the circuit regardless of external contact.

Referring now to FIG. 7, a three phase system with current monitors, circuit breakers, circuit breaker coils, and control systems CSBA1 through CSBA3 similar to those shown in FIG. 6 is shown. In this case, however, the outputs and inputs of the control systems CSBA1 through CSBA3 are interconnected differently from the interconnection shown in FIG. 6. This may be called a series interconnection. Once again, all of the common lines I are tied together and once again the long delay and short delay signal outputs III and IV for control systems CSBA1 are connected to the inputs II and V of the control system CSBA2 as was the case with respect to the embodiment shown in FIG. 6. However they are not connected to the same terminals of the control system CSBA3. Rather the output terminals III and IV of control system CSBA2 are connected to the input terminals II and V of control system CSBA3 respectively. In this case if a current overload of a sufficient magnitude is detected downstream of the first station, CSBA1, circuit breaker CBA1 will open instantaneously regardless of the magnitude of the fault while control system CSBA2 will time out in its normal fashion on either long delay or short delay and control system CSBA3 will time out in the same manner as control system CSBA2, unless control system CSBA2 provides the overriding output signals on lines III and IV thereof as described previously. In the latter case, the circuit breaker system CSBA3 will then be placed in an overriding mode and will not time out in its normal fashion.

The interconnections shown with regard to FIGS. 6 and 7 are by no means the only ways that circuit breaker control systems can be interconnected to talk or communicate electrically with each other by way of lines I through V, nor is the system limited to three stations. Nor does the interconnection arrangement have to be made between adjacent stations on the same line. Regardless of the interconnection, the present invention provides a means of attempting to clear faults in a distribution line to prevent it from becoming unnecessarily shut down while at the same time retaining the protective capability of the various circuit breaker systems. Generally, the system which is closest to the fault will open generally instantaneously regardless of the level of the fault but at the same time provide signals to other stations allowing the other stations to time out in normal long delay or short delay fashion.

It is to be understood with respect to the embodiments of this invention that it is not limited to PNP or NPN type transistors or 34 volt electrical systems. It is also to be understood that the system may operate on three phase, multi-phase, or single phase protective circuits, or there may be multiple loads or multiple sources. It is also to be understood that in some embodiments of the invention the output and input terminals I through V of the circuit breaker stations may be interconnected with each other rather than with remote stations for therefore providing desirable circuit breaker timing functions. It is also to be understood that the type of comparators are not limiting, nor is it necessary for all output terminals of all circuit breakers to be used simultaneously or even to be interconnected at all. It is also to be understood that the type of circuit breaker apparatus is not limiting provided it has the capability of opening and closing during appropriate times. It is also to be understood that although the utilization of the embodiments of this invention with the apparatus taught in U.S. Pat. No. 3,660,722, it is envisioned that the concepts of this invention are limited to that apparatus exclusively.

The apparatus taught herein has many advantages. One advantage lies in the fact that the well-known circuit breaker control stations may be interconnected one with the other to provide communications between stations to better protect an electrical system. Another advantage lies in the fact that a circuit breaker can be caused to open even on a relatively low value of fault or overload current to attempt to clear the fault without requiring the normal short delay or long delay time-out operation and without interrupting other portions of the system which may be providing electrical power to other systems and loads.

What I claim as my invention is:

1. An electrical circuit interrupter for responding to electrical current in an electrical transmission system for protecting said transmission system, comprising:
   (a) signal conditioner means interconnected with said transmission system for providing a conditioned output signal which is related to the amount of electrical current which flows in said transmission system;
   (b) warning signal means interconnected with said signal conditioner means for providing a warning output signal when said conditioned output signal attains a first predetermined value;
   (c) time delay triggering means interconnected with said signal conditioner means for providing as an output a circuit interrupter triggering signal at a predetermined delay time after said conditioned output signal attains a second predetermined value;
   (d) instantaneous triggering means interconnected with said signal conditioner means for providing as an output a circuit interrupter triggering signal instantaneously with said conditioned output signal attaining said second predetermined value;
   (e) disable means with an input terminal and with an output terminal, said output terminal being interconnected with said instantaneous trigger means for disabling said instantaneous trigger means when a predetermined disable means input signal is present on said input terminal; and
   (f) circuit interrupter control means interconnected at an input thereof with said time delay triggering means and said instantaneous triggering means for actuating said circuit interrupter to open said transmission line whenever a circuit interrupted triggering signal is received at said latter input.

2. The combination as claimed in claim 1, wherein said conditioned output signal is a voltage level which is proportional to said amount of electrical current.

3. The combination as claimed in claim 1, wherein said warning output signal comprises a generally constant voltage level when present.

4. The combination as claimed in claim 1, wherein said first predetermined voltage level is larger in absolute value than said second predetermined voltage level to thus cause said warning output signal to be provided before said second predetermined voltage level is attained.

5. The combination as claimed in claim 4, wherein said warning output signal is provided to the input terminal of a disable means of a similar electrical protective device on said transmission system to prevent instantaneous opening of the circuit interrupter of said latter protective device.

6. The combination as claimed in claim 1, wherein said disable means input signal is a warning means output signal from a similar electrical protective device.

7. The combination as claimed in claim 1, wherein said conditioned output signal comprises an electrical control current level.

8. An electrical circuit interrupter for responding to electrical current in an electrical transmission system for protecting said transmission system, comprising:
   (a) signal conditioner means interconnected with said transmission system for providing a conditioned output signal which is related to the amount of electrical current which flows in said transmission system;
   (b) warning signal means interconnected with said signal conditioner means for providing a warning output signal when said conditioned output signal attains a first predetermined value;
   (c) time delay triggering means interconnected with said signal conditioner means for providing as an output a circuit interrupter triggering signal at a delay time which is inversely proportional to the square of said current after said current attains a second predetermined value;
   (d) instantaneous triggering means interconnected with said signal conditioner means for providing as an output a circuit interrupter triggering signal instantaneously with said conditioned output signal attaining said second predetermined value;
   (e) disable means with an input terminal and with an output terminal, said output terminal being interconnected with said instantaneous trigger means for disabling said instantaneous trigger means when a predetermined disable means input signal is present on such input terminal; and
   (f) circuit interrupter control means interconnected at an input thereof with said time delay triggering means and said instantaneous triggering means for actuating said circuit interrupter to open said transmission line whenever a circuit interrupted triggering signal is received at said latter output.

9. The combination as claimed in claim 8, wherein said conditioned output signal is a voltage level which is proportional to said amount of electrical current.

10. The combination as claimed in claim 8, wherein said warning output signal comprises a generally constant voltage level when present.

11. The combination as claimed in claim 8, wherein said first predetermined voltage level is larger in absolute value than said second predetermined voltage level to thus cause said warning output signal to be provided before said second predetermined voltage level is attained.

12. The combination as claimed in claim 11, wherein said warning input signal is provided to the output terminal of a disable means of a similar electrical protective device on said transmission system to prevent instantaneous opening of the circuit interrupter of said latter protective device.

13. The combination as claimed in claim 8, wherein said disable means input signal is a warning means output signal from a similar electrical protective device.

14. The combination as claimed in claim 8, wherein said conditioned output signal comprises an electrical control current level.

* * * * *